UNITED STATES PATENT OFFICE.

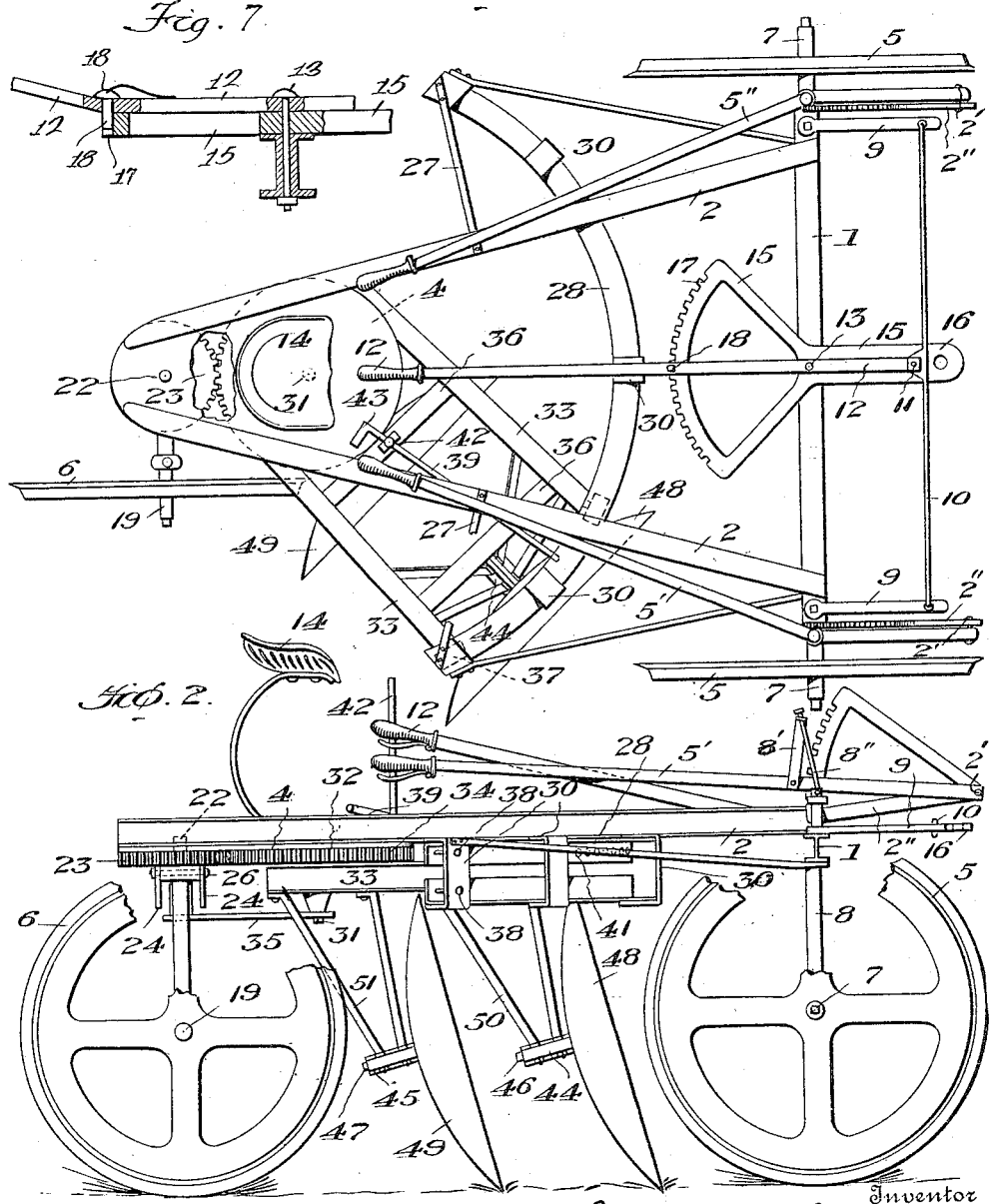

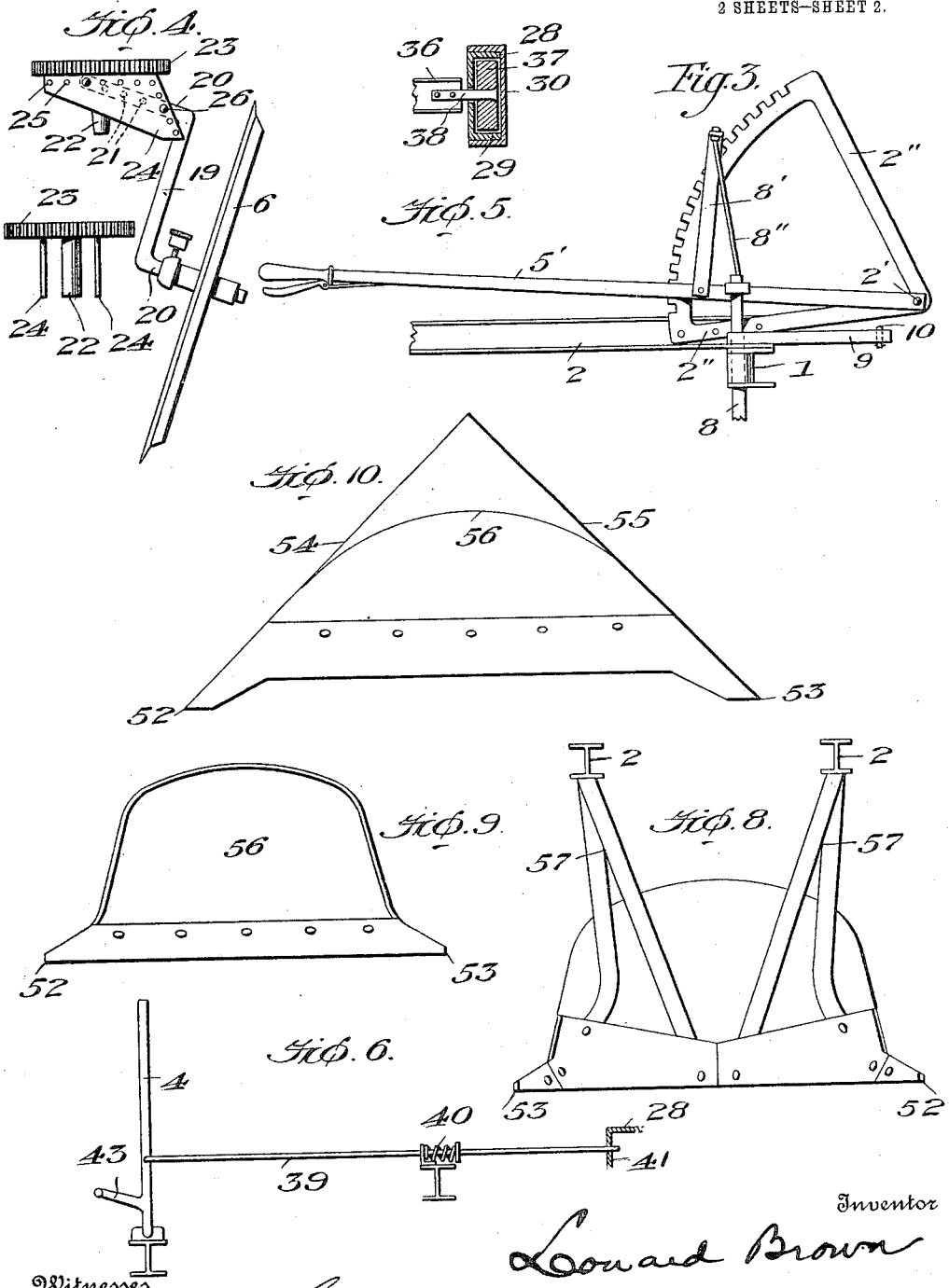

LEONARD BROWN, OF CAMBRIDGE, IDAHO, ASSIGNOR OF TWO-FIFTHS TO ELISHA H. SWISHER, OF INDIAN VALLEY, IDAHO.

REVERSIBLE GANG-PLOW.

1,127,179.  Specification of Letters Patent.  Patented Feb. 2, 1915.

Application filed April 19, 1913.  Serial No. 762,300.

*To all whom it may concern:*

Be it known that I, LEONARD BROWN, a citizen of the United States, residing at Cambridge, county of Washington, and State of Idaho, have invented certain new and useful Improvements in Reversible Gang-Plows, of which the following is a specification.

This invention relates to reversible gang plows.

My object is to provide an improved reversible gang plow having means for the use of plow disks or shares, as may be desired, and means for swinging the plowing implement from one position to another; further, to provide for adjustment whereby one or more mold boards or disks may be put on or taken off according to the horse power available; to provide improved means whereby the plow may be steered by hand and by the team and to provide for steering both of the front wheels simultaneously, thus insuring easier draft and less strain on the machine when turning.

Further objects are to provide a novel mounting for the plowing means, whereby the supporting frame therefor may be swung by hand and by the draft of the animals from one side of the machine to the other to reverse the said plowing means and, also, a rear furrow wheel which is swung and reversed automatically with the shifting of the frame carrying the plowing means; further to provide means for adjusting the rear furrow wheel; means for locking the reversible frame, and other improved features and constructions, all of which appear more fully hereinafter.

In the accompanying drawings:—Figure 1 is a plan view; Fig. 2, a side elevation; Fig. 3, a detail view of the mounting for one of the front wheels; Fig. 4, detail views of the adjustable mounting for the rear furrow wheel; one of said views showing the gear detached; Fig. 5, a detail view of the roller and track for the swinging frame; Fig. 6, a detail view of the locking device for the swinging frame; Fig. 7, a detail view of the means for locking the steering lever so that the animals may steer the machine; Fig. 8, a back view of the double mold board plow; Fig. 9, a front view thereof; and Fig. 10, a top view.

The main frame of the machine is composed of an axle 1, rearwardly converging frame-pieces 2, and a plate 4 joining said frame-pieces 2. The axle 1 and frame pieces 2 are of I-beam construction. The front or steering wheels 5 and the rear furrow wheel 6 have sharp flanges which by entering the earth prevent slipping or skidding of the machine and tend to cause it to resume its normal position if it is offset by a chunk of wood, rock or a large root striking the plow disks or mold board.

The steering wheels 5 are mounted on axles 7 which have upwardly extending parts 8 journaled in the axle 1 and provided with arms 9 which are connected together by a bar 10 to which is pivoted at 11 a steering lever 12, in turn pivoted at 13 and reaching back in convenient position to the driver's seat 14. Pivoted to the axle 1 at 13 is the draft steering member 15 which has a clevis 16 at its forward end for the attachment of the draft apparatus and at its rear end is provided with teeth 17 adapted to be engaged by a latching device 18 on the lever 12. When the latching device 18 is engaged with the teeth 17, the draft of the animals exerted at 16, causes the member 15 to swing on the pivot 13, and through the lever 12, to shift the rod 10 back and forth and thus turn the axles of the steering wheels 5 so that the steering of the machine is carried on by the movement of the horses. If the latching device 18 is released, there being no engagement between the lever 12 and the steering member 15, the driver may steer by manipulating the lever 12, but at all other times the animals steer the machine.

Referring to Figs. 1, 2 and 3, separate levers 5' and 5", arranged for manipulation by the driver, are pivoted at 2' to toothed segments 2" secured to frame members 2. The levers 5', 5" have arms 8' which are connected to axles 8 by links 8". Suitable latch mechanism on levers 5', 5" is adapted to lock said levers to the segments 2". By raising and lowering the levers, the frame 1, 2, may be lowered or raised to register the depth of cultivation.

The rear furrow wheel 6 is mounted on an axle 19 which has horizontally extending parts 20 provided with openings 21. Journaled to the plate 4 is the stud spindle 22 of a gear 23. The gear 23 is provided with parallel plates 24 (Fig. 4) having apertures 25 through which and through the apertures 21 may be passed any suitable bolt or fastening 26 for securing the axle 19 at any desired position of adjustment according to the furrow.

Secured to the frame members 2 by braces 27 is an arc-shaped track composed of upper and lower angle iron members 28 and 29 which are connected at intervals by clamps or hangers 30 to interbrace them and keep them in parallel relation to each other.

Pivoted at 31 to plate 4 is a plate 32 to which the members 33 of the swinging frame are connected, the said plate having a toothed or gear surface 34 meshing with the gear 23. A plate 35 connects the pivots 22 and 31 and supports the parts. The plates 4 and 35 are spaced apart by sleeves or tubes through which the pivot bolt 31 passes.

The frame members 33 are connected by cross braces 36 and they have rollers 37 mounted on projecting members 38 at their ends, the said rollers traveling on the track members 28 and 29, resting on the latter and being prevented from having upward movement by the former. The frame composed of the plate 32, members 33 and braces 36 is therefore, adapted to swing laterally from side to side of the machine, one extreme position being indicated in full lines. Slidable on the outer cross brace 36 is a locking rod 39 (Fig. 6) which is provided with a spring 40 adapted to force the end of the rod into openings 41 suitably located in the track member 28 to thereby lock the swinging reversible frame in different desired positions, there being as many of these openings 41 extending along the length of the track as desired. On the remaining brace 36 is a rockably mounted lever 42 which has a foot piece 43, both the lever and foot piece being arranged conveniently for the driver so that by hand or foot he may retract the rod 39 and disengage the tip thereof from the hole 41 in which it is received, thus freeing the swinging frame, whereupon the latter may be swung laterally of the machine by hand or automatically by the draft on turning the end of the furrow. Boxings 44 and 45 support the axles 46 and 47 of the plow disks 48 and 49 of the gang of disks. Each of the boxings is supported below the members 33 by braces 50 in one instance, and 51 in the other instance.

Referring to Figs. 8, 9 and 10, I have there shown a double mold board plow which may be substituted for the respective disks 48 and 49, that is to say, one or more of these plows may be used in place of the disks. The plows have duplex points 52, 53, land sides 54, 55, and a rounded concave mold board 56. Braces 57 are substituted for the braces 50 and bolted to the members 33.

The steering operation has heretofore been described. On releasing the locking rod 39, the reversible frame and the plowing implements may be swung by hand from one side of the machine or the other or this will be automatically brought about by the draft on turning the end of the furrow. In either event, the engagement of the gears 33 and 34 causes a complete reversal of the rear furrow wheel 6.

In the present machine, any desired positioning of the swinging frame and locking it where positioned, may be had; the soil does not have to be turned up hill; both front wheels being steered by the team insures an easy draft and less strain on the machine when turning than if but one wheel were employed; the back furrow wheel always runs solid with the plow and does not turn down hill when the team is pulled up hill as is the case with ordinary plows having tongues; the construction of the wheels prevents skidding or slipping; if an obstacle is struck which might tend to throw the plow down hill, the steering of the front wheels causes the machine to adjust itself and it will climb back up hill.

The foregoing recital of operation and advantages is not to be deemed as restrictive, but only illustrative thereof.

Having thus described my invention, what I claim as new and desire to secure by Letters Patent, is:—

1. In a wheeled plow, the combination with a main frame, of ground wheels therefor, a plow frame whose rear part is pivoted to the main frame and whose front part is mounted on and wholly suspended by said main frame, locking means for securing the plow frame to the main frame, and cultivating means carried by the plow frame, said main frame being adapted when the cultivating means is engaged with the ground and when the plow frame is unlocked, to swing laterally in relation to the plow frame.

2. In a wheeled plow, the combination with a main frame, of ground wheels therefor, a plow frame whose rear part is pivoted to the main frame and whose front part is mounted on and wholly suspended by said main frame, locking means for securing the plow frame to the main frame, cultivating means carried by the plow frame, said main frame being adapted when the cultivating means is engaged with the ground and when the plow frame is unlocked, to swing laterally in relation to the plow frame, and a reversible ground wheel coöperatively related to the plow frame and arranged to support the main frame, said ground wheel being shifted when the main frame is shifted.

3. In a wheeled plow, the combination with a main frame, of ground wheels therefor, a plow frame whose rear part is pivoted to the main frame and whose front part is mounted on and wholly suspended by said main frame, locking means for securing the plow frame to the main frame, cultivating means carried by the plow frame, said main frame being adapted when the cultivating means is engaged with the ground and when the plow frame is unlocked, to swing laterally in relation to the plow frame, and a reversible ground wheel pivoted to the main frame and adapted to shift from one side to the other of the line of draft thereon, said wheel being coöperatively related to the plow frame, whereby said ground wheel is shifted when the main frame is shifted.

4. In a wheeled plow, the combination with a main frame, of an arcuate track attached thereto, a plow frame pivoted to the main frame at one end and having its free part wholly suspended by and adapted to travel on said track, cultivating means carried by said plow frame, and means for locking the plow frame to different parts of said track, said plow frame being free when unlocked, whereby when the cultivating means are engaged with the ground, the main frame may swing laterally in relation to the plow frame.

In testimony whereof, I hereunto affix my signature in presence of two witnesses.

LEONARD BROWN.

Witnesses:
D. L. CARTER,
HENRY J. DWANEY.

Copies of this patent may be obtained for five cents each, by addressing the "Commissioner of Patents, Washington, D. C."